(12) United States Patent
Geidek et al.

(10) Patent No.: US 8,199,405 B2
(45) Date of Patent: Jun. 12, 2012

(54) TACTICAL RADIATING DEVICE FOR DIRECTED ENERGY

(75) Inventors: Franz Geidek, Aresing (DE); Norbert Nissl, Langenmosen (DE); Rudolf Protz, Hoehenkirchen-Siegertsbrunn (DE); Juergen Zoz, Friedberg (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 190 days.

(21) Appl. No.: 12/608,552

(22) Filed: Oct. 29, 2009

(65) Prior Publication Data

US 2010/0110557 A1    May 6, 2010

(30) Foreign Application Priority Data

Oct. 31, 2008   (DE) .......................... 10 2008 054 263

(51) Int. Cl.
| | |
|---|---|
| *G02B 27/10* | (2006.01) |
| *G02B 27/30* | (2006.01) |
| *H01S 3/10* | (2006.01) |
| *H01S 3/04* | (2006.01) |
| *H01S 3/08* | (2006.01) |

(52) U.S. Cl. ............ 359/627; 359/626; 359/641; 372/9; 372/34; 372/99; 372/101

(58) Field of Classification Search ................... 359/618, 359/627, 626, 641; 372/9, 34–36, 99, 101, 372/107

See application file for complete search history.

(56) References Cited

U.S. PATENT DOCUMENTS

| | | | |
|---|---|---|---|
| 5,963,374 A | 10/1999 | Endou et al. | |
| 6,229,940 B1 | 5/2001 | Rice et al. | |
| 6,552,853 B2 * | 4/2003 | Goodman | 359/627 |
| 6,888,853 B1 | 5/2005 | Juergensen | |
| 6,943,957 B2 * | 9/2005 | Gao et al. | 359/634 |
| 6,995,912 B2 * | 2/2006 | Okazaki et al. | 359/619 |
| 2004/0016718 A1 | 1/2004 | Hwu et al. | |
| 2005/0169323 A1 | 8/2005 | Spariosu et al. | |
| 2006/0132903 A1 | 6/2006 | Shakir et al. | |

FOREIGN PATENT DOCUMENTS

| | | |
|---|---|---|
| DE | 198 40 926 A1 | 5/2000 |
| EP | 1 962 393 A1 | 8/2008 |

* cited by examiner

*Primary Examiner* — Jack Dinh
(74) *Attorney, Agent, or Firm* — Crowell & Moring LLP

(57) ABSTRACT

A tactical radiating device for directed energy includes at least two generators of high energy directed beams. At least one beam combining system combines high energy directed beams emitted by the generators into a combined high energy beam. A focusing device focuses the combined high energy beam.

9 Claims, 1 Drawing Sheet

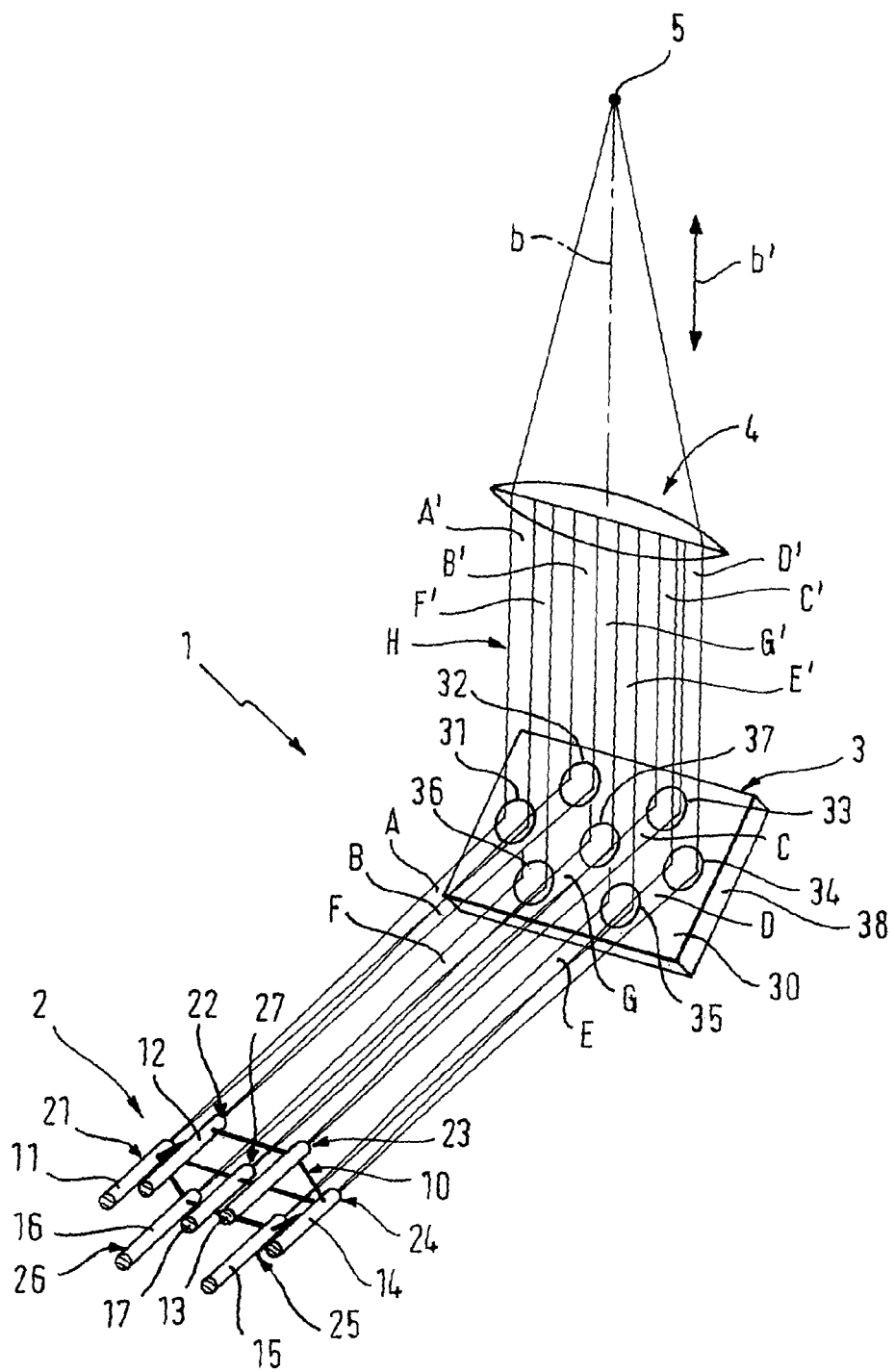

TACTICAL RADIATING DEVICE FOR DIRECTED ENERGY

This application claims the priority of German patent document 10 2008 054 263.6, filed Oct. 31, 2008, the disclosure of which is expressly incorporated by reference herein.

TECHNICAL FIELD

The present invention relates to a tactical radiating device for directed energy. Such tactical radiating devices are also called energy weapons and can be designed, for example, as a laser weapon.

BACKGROUND ART

Laser weapons are employed in the field of anti-missile defense, in which bundled laser beams are used to exert over a long distance (up to a few hundred kilometers), a thermal effect on the outer skin of the missile, so as to aerodynamically destabilize it. One example of such a weapon is the airborne laser weapon system Boeing YAL-1 of the U.S. Airforce.

Another possible application for such high energy radiating weapons is on battle fields, over a distance ranging from a few hundred meters up to a few kilometers. In this case the high energy radiating device exerts a thermal effect on weapons or ammunition that renders them ineffective for action.

For such a weapon, it is necessary to provide a tactical radiating device, which generates directed energy, and which is able to emit very high radiation in such a manner that upon arrival on a target, the radiation remain sufficiently high, to achieve the desired thermal effect on the target.

In order to successfully combat mortar grenades and similar targets with such a high energy laser weapon, it must be able to generate a focal point with an intensity exceeding 10 kW/cm$^2$ on the target in a distance range of approximately one to three kilometers. In order to meet these requirements, the laser weapon needs a laser source having power of more than 100 kW. The development of high energy radiating devices (for example, high energy lasers) that are suited for such applications, is time consuming and expensive and entails considerable implementation risks.

For industrial applications (for example, laser beam welding), there already exist lasers that have a power of a few kW and almost diffraction limited beam quality (measured diffraction magnitude m$^2$<1.1). Even though it appears that this power can actually be increased somewhat, such an amount of power is nowhere near adequate to satisfy the requirements of a tactical radiating device that can exert an effective energy impact on an object at a distance of several hundred meters or even several kilometers.

BRIEF SUMMARY OF THE INVENTION

One object of the present invention is to provide a tactical radiating device, which is intended for directed energy and which achieves, at a negligible cost, an effective energy impact on an object, from a distance ranging from several hundred meters up to a few kilometers.

This and other objects and advantages are achieved by the tactical radiating device according to the invention, which includes at least two generators of high energy directed beams, at least one beam combining system which combines the high energy directed beams emitted by the generators into a combined high energy beam, and a focusing device for the combined high energy beam.

ADVANTAGES

The inventive combining of the high energy directed beams from at least two beam generators to form a combined high energy beam makes it possible to generate such a high energy beam using only commercially available beam generators. Such a high energy beam can also exert a significant thermal effect on a target object over a greater distance.

Preferably the generators of high energy directed beams include laser sources. In this case, especially suitable laser beams are those having a wavelength of about 1 µm.

Preferably the respective laser source is formed by a solid laser, such as are already available as industrial lasers for material processing, whose power can thus be increased at a negligible cost. As a result, such ultra high performance laser sources can be put into use by a preferred method in the inventive tactical radiating device for directed energy.

Preferably the respective laser source is formed by a fiber laser, which offers the advantage that the laser beam is captured in a light guiding member. As a result, it can be easily steered to a specific location and in a specific direction, a feature that significantly simplifies the configuration of the beam combining system.

Furthermore, the laser source is preferably a single mode laser source and generates laser radiation of only one oscillation mode.

Preferably the beam combining system has beam combining optics, so that the high energy directed beams issuing from the generators are aligned relative to each other by the beam combining optics and are aimed at the focusing device. In the beam combining optics the individual high energy directed beams are aligned substantially parallel to each other or at a slight angle of inclination to each other, in such a manner that they impinge jointly on the focusing device, and are bundled by the focusing device into a single high energy beam.

Preferably the beam combining optics form the collimating optics, which combine the individual high energy directed beams into a beam bundle, which is composed of parallel beams and which forms the combined high energy beam.

To this end in a preferred embodiment the collimating optics include a plurality of (preferably parabolic) collimating mirrors. Such collimating optics may comprise, for example, a number of collimating mirrors equal to the number of beam generators. At the same time, each collimating mirror, which is configured for example as an off axis parabolic mirror, accommodates one of the high energy directed and slightly divergent energy beams issuing from the respective generator, and converts it into a parallel beam. Hence, the collimating mirrors are arranged in such a manner that the parallel beams, issuing from the individual collimating mirrors collectively represent a beam bundle which is composed of parallel beams and which forms the combined high energy beam.

Advantageously, the focusing device is configured in such a manner that it can focus the combined high energy beam into a focal point. To this end, the focusing device preferably comprises a reflecting telescope.

In order to dissipate the waste heat that is generated in the beam combining system and induced by the high energy radiation, the beam combining system is provided with at least one cooling device. Similarly the focusing device can also have at least one cooling device to carry away the waste heat generated in the focusing device.

Preferred embodiments of the invention with additional design details and additional advantages are described in detail and explained below with reference to the attached drawings.

BRIEF DESCRIPTION OF THE DRAWING

The single FIGURE is a schematic drawing of the beam path in a tactical radiating device according to the invention.

DESCRIPTION OF PREFERRED EMBODIMENTS

FIG. 1 is a schematic drawing, depicting the beam path in a tactical radiating device of the invention. In a beam combining system 1, a mechanical holder 10 (shown only schematically), has a plurality of light guides 11, 12, 13, 14, 15, 16, 17, which are arranged with high accuracy in their position and in their angle in relation to each other. Together with their respective light exit faces, these light guides form a beam source system 2. In order to properly position the light guides, adjusting elements are provided, which can be used in a manner known to the person skilled in the art to adjust the position and the angular positioning of the respective light guides.

The illustrated example shows seven light guides, of which six (11, 12, 13, 14, 15, 16) are arranged in a hexagonal manner (in the corners of an imaginary hexagon), and wherein a seventh light guide 17 is provided in the center of the hexagonal arrangement. The light guides 11, 12, 13, 14, 15, 16, 17 are anchored in the mechanical holder 10 in the immediately vicinity of their respective light exit face. Preferably the individual light guides 11, 12, 13, 14, 15, 16, 17 are designed as individual single mode fibers.

In the illustrated example, each of the individual light guides 11, 12, 13, 14, 15, 16, 17 is a component of a fiber laser. Each of these fiber lasers forms a generator 21, 22, 23, 24, 25, 26, 27 for high energy directed laser beams. Instead of using fiber lasers, it is also possible, however, to provide separate laser modules as the generators of the high energy directed beams. Then the radiation of each laser module is coupled into an assigned light guide.

The respective end segments of the light guides 11, 12, 13, 14, 15, 16, 17 are anchored in the mechanical holder 10 in such a manner that slightly divergent light beams A, B, C, D, E, F, G, emerging from the respective light exit port impinge on the beam combining optics 3, situated at a distance from the mechanical holder 10. Each of the slightly divergent light beams A, B, C, D, E, F, G, is aligned relative to the others in such a manner that the respective beams axis run parallel to each other.

The beam combining optics 3 comprises a mechanical holder 30, on which are mounted a number of collimating mirrors 31, 32, 33, 34, 35, 36, 37 equal to the number of light guides 11, 12, 13, 14, 15, 16, 17. The collimating mirrors are arranged in a manner that is also analogous to the arrangement of the light guides (that is, in a hexagonal manner, with a centrally situated center mirror). The mechanical holder 30 of the beam combining optics 3 is aligned in relation to the mechanical holder 10 in such a manner that one of the diverging beams A, B, C, D, E, F, G, emerging from the light guides 11, 12, 13, 14, 15, 16, 17, impinges essentially in its entirety on each of the collimating mirrors 31, 32, 33, 34, 35, 36, 37 and is converted into a basically parallel laser beam A', B', C', D', E', F', G' by the assigned collimating mirror 31, 32, 33, 34, 35, 36, 37 and is deflected in its direction of propagation. Collectively, the deflected parallel beams form a beam bundle, which is composed of parallel beams and which in turn forms a high energy beam H.

The beam bundle of the parallel beams A', B', C', D', E', F', G' deflected by the collimating mirrors 31, 32, 33, 34, 35, 36, 37, strikes a focusing device 4, which is depicted in the manner of a symbol as a collecting lens in the example in FIG. 1. In the focusing device 4 the high energy beam H, formed by the beam bundle, is focused onto a focal point 5. By suitably designing the focusing device 4, its focal length b can be changed in the direction of the double arrow b' in a way that is known to the person skilled in the art. This means that the focal point 5, in which all of the energy of the beam generators 21, 22, 23, 24, 25, 26, 27 is combined, can be adjusted in its distance from the focusing device in accordance with the employment requirements.

The back side of the collimating mirrors 31 is provided with a cooling device 38 in the area of the mechanical holder 30. Said cooling device is a component of a cooling system for the beam combining optics 3 and dissipates the heat, generated by the laser beams in the collimating mirrors 31.

The mechanical holder 10 can also be provided with a cooling device (not illustrated).

The reference numerals in the claims, the description and the drawings serve only for the purpose of facilitating a better understanding of the invention and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS

They denote as follows:
1 beam combining system
2 beam source system
3 beam combining optics
4 focusing device
5 focal point
10 holder
11 light guide
12 light guide
13 light guide
14 light guide
15 light guide
16 light guide
17 light guide
21 generator
22 generator
23 generator
24 generator
25 generator
26 generator
27 generator
30 holder
31 collimating mirror
32 collimating mirror
33 collimating mirror
34 collimating mirror
35 collimating mirror
36 collimating mirror
37 collimating mirror
38 cooling element
b focal length b' double arrow
A diverging laser beam
A' parallel laser beam
B diverging laser beam
B' parallel laser beam
C diverging laser beam
C' parallel laser beam
D diverging laser beam
D' parallel laser beam
E diverging laser beam
E' parallel laser beam
F diverging laser beam
F' parallel laser beam
G diverging laser beam
G' parallel laser beam
H high energy beam
L diverging laser beam
L' parallel laser beam

What is claimed is:

1. A tactical radiating device for directed energy, said radiating device comprising:
   at least two generators of high energy directed beams;
   at least one beam combining device, which combines the high energy directed beams, emitted by the generators, into a combined high energy beam, wherein the beam combining device comprises beam combining collimating optics configured such that the individual high energy directed beams are combined into a beam bundle composed of parallel beams, which is the combined high energy beam; and
   a focusing device for the combined high energy beam, wherein the collimating optics includes a plurality of collimating mirrors, wherein said collimating minors are parabolic mirrors.

2. The tactical radiating device, as claimed in claim 1, wherein the generators of the high energy directed beams comprise laser sources.

3. The tactical radiating device, as claimed in claim 2, wherein the respective laser sources comprise solid lasers.

4. The tactical radiating device, as claimed in claim 2, wherein the respective laser sources comprise a fiber laser.

5. The tactical radiating device, as claimed in claim 2, wherein the laser source is a single mode laser source that generates laser radiation in only one oscillation mode.

6. The tactical radiating device, as claimed in claim 1, wherein the combined high energy beam can be focused into a focal point by means of a focusing device.

7. The tactical radiating device, as claimed in claim 6, wherein the focusing device comprises a reflecting telescope.

8. The tactical radiating device, as claimed in claim 1, wherein the focusing device has at least one cooling device.

9. The tactical radiating device, as claimed in claim 1, wherein the device is configured such that the combined high energy laser beam has an intensity exceeding 10 kW/cm$^2$ at a distance range of approximately one to three kilometers.

* * * * *